US007623836B1

(12) United States Patent
Finkelstein

(10) Patent No.: US 7,623,836 B1
(45) Date of Patent: Nov. 24, 2009

(54) ANTENNA SELECTION FOR MULTICARRIER COMMUNICATIONS

(75) Inventor: Yuval Finkelstein, Yokneam Elite (IL)

(73) Assignee: Intel Corporation, Santa Clara, CA (US)

( * ) Notice: Subject to any disclaimer, the term of this patent is extended or adjusted under 35 U.S.C. 154(b) by 1209 days.

(21) Appl. No.: 10/465,291

(22) Filed: Jun. 19, 2003

(51) Int. Cl.
*H04B 1/06* (2006.01)
(52) U.S. Cl. .............. 455/277.1; 455/133; 455/137; 455/134; 455/278.1; 455/277.2; 455/68
(58) Field of Classification Search .............. 455/513, 455/60, 27, 7.1, 133, 137, 277.2
See application file for complete search history.

(56) References Cited

U.S. PATENT DOCUMENTS 6,021,124 A 2/2000 Haartsen
6,085,076 A * 7/2000 Lindsay et al. ............ 455/277.1
2004/0085946 A1* 5/2004 Morita et al. ................ 370/342

FOREIGN PATENT DOCUMENTS

WO    WO 00/72498 A1    11/2000

OTHER PUBLICATIONS

Finkelstein, Yuval, "Antenna Selection in Multicarrier Communication Systems", *Intel Technology Journal*, vol. 7, Issue 2, (May 21, 2003), 50-58.

* cited by examiner

*Primary Examiner*—Charles N Appiah
*Assistant Examiner*—Randy Peaches
(74) *Attorney, Agent, or Firm*—The Law Offices of John C. Scott, LLC; John C. Scott

(57) ABSTRACT

Antenna selection is performed in a multicarrier communication system based on antenna scores. In at least one embodiment, an antenna score is calculated for an antenna by determining grades for individual carriers associated with the antenna based on corresponding signal magnitude related parameters and then combining the grades in a predetermined fashion.

23 Claims, 2 Drawing Sheets

ANTENNA SELECTION FOR MULTICARRIER COMMUNICATIONS

FIELD OF THE INVENTION

The invention relates generally to wireless communications and, more particularly, to multicarrier wireless communications.

DETAILED DESCRIPTION

Figure 1:
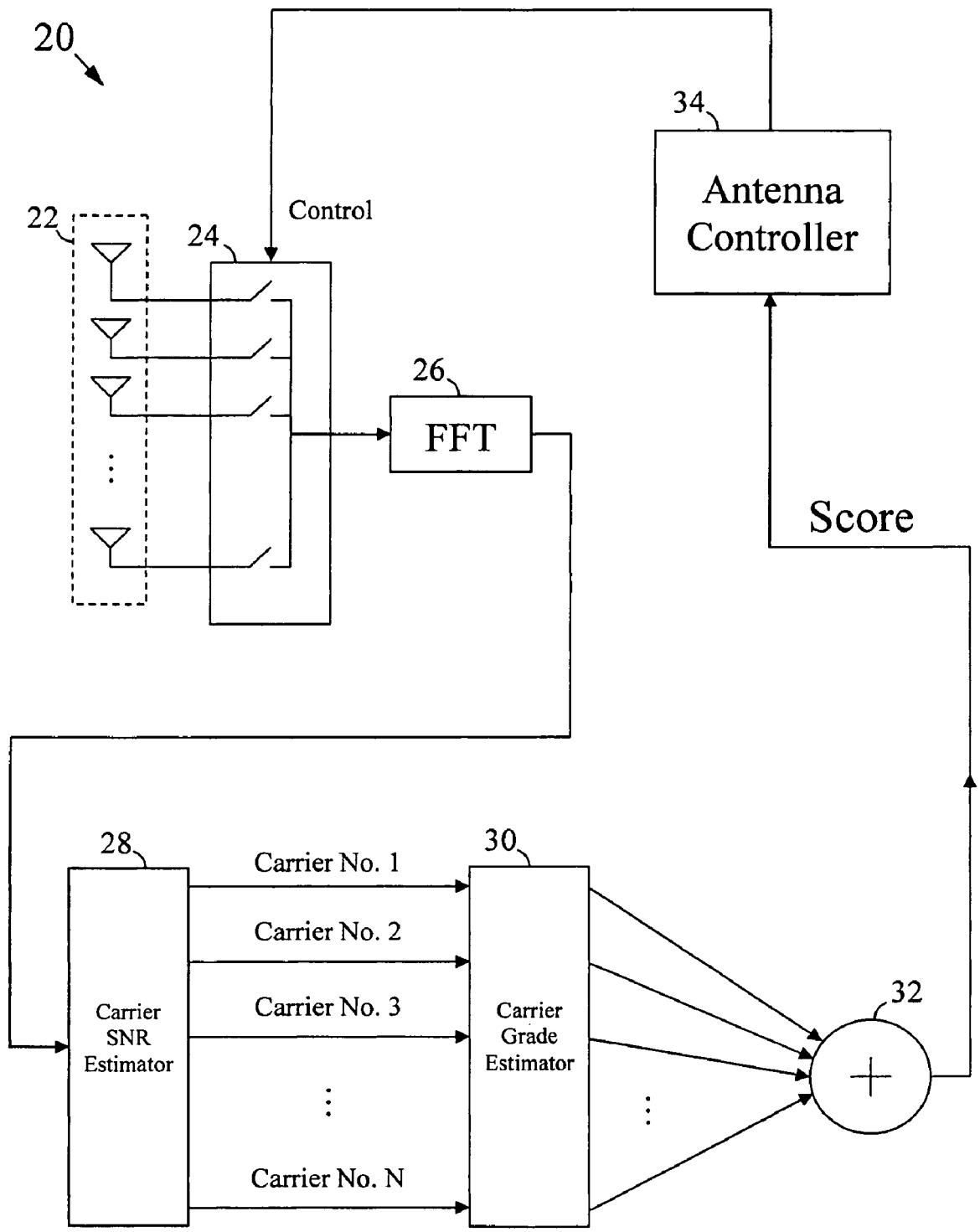
FIG. 1 is a block diagram illustrating an example system for use in selecting an antenna in a multicarrier receiver in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Multicarrier communication is a technique for transmitting data that divides the data into multiple pieces and then transmits the pieces in parallel via a number of separate narrowband carriers. Multicarrier communication is often used to overcome intersymbol interference in channels by increasing the symbol period of the carrier, thus limiting the data rate transmitted over each carrier (or sub-channel). When the symbol period transmitted through a sub-channel is longer than the maximum multipath delay in the channel, the effect of intersymbol interference may be reduced significantly. Because multiple carriers are used, relatively high data rates may be achieved overall. Although the effect of intersymbol interference is reduced, multipath fading may still distort the data in a multicarrier system. For example, some of the carriers may experience greater fading than others so that the signal magnitudes received by a receiver are different for different carriers (i.e., non-homogeneous carrier amplitudes). The carriers that experience greater levels of multipath fading will typically have lower signal-to-noise ratios (SNR) at the receiver.

Low SNR of one or more carriers may be partly overcome by applying antenna diversity at the receiver. Full antenna diversity typically involves receiving data simultaneously through multiple antennas. While effective, this solution can be very expensive to implement. To reduce costs, therefore, semi-diversity may be implemented. In semi-diversity, a single antenna (or small group of antennas) is selected for use as the receive antenna out of a given set of antennas. As will be appreciated, it is desirable that the antenna (or small group of antennas) that is selected offer the most reliable detection. Antenna selection has traditionally been performed based upon total antenna power in a semi-diversity arrangement. However, this criterion is not optimal as total power is only one factor that might affect the performance of a receiver in a multicarrier system. Methods and structures are presented herein that may be used to enhance the antenna selection process in a multicarrier environment.

FIG. 1 is a block diagram illustrating an example system 20 for use in selecting an antenna in a multicarrier receiver in accordance with an embodiment of the present invention. The example system 20 is adapted for use in an Orthogonal Frequency Division Multiplexing (OFDM) type of multicarrier system, but the inventive features incorporated therein may be used in virtually any type of multicarrier system. As illustrated, the system 20 includes: a group of antennas 22, an antenna switch 24, a fast Fourier transform (FFT) 26, a carrier signal-to-noise ratio (SNR) estimator 28, a carrier grade estimator 30, a combiner 32, and an antenna controller 34. In at least one embodiment, the antenna switch 24 may be operative for coupling one of the antennas in the group 22 to the FFT 26 under the control of the antenna controller 34. The group of antennas 22 may include any number of antennas. The FFT 26 (or other discrete Fourier transform unit) transforms a signal received by the corresponding antenna from a time domain representation into a frequency domain representation that may then be demodulated to identify the constellation points that were transmitted by a remote transmitter. Discrete Fourier transform operations will typically be performed in OFDM-type multicarrier systems and may be optional in other forms of multicarrier systems. The carrier SNR estimator 28 processes the receive signal to determine an SNR for individual carriers within the signal. In other embodiments, other forms of signal magnitude related parameter (i.e., other than SNR) are determined for the individual carriers of the received signal. For example, in at least one embodiment, a carrier magnitude estimator is used in place of the carrier SNR estimator 28 to estimate the signal magnitudes of the carriers within the receive signal. The received signal may include any number of carriers.

The SNR values (or other signal magnitude related parameter values) generated by the carrier SNR estimator 28 are delivered to the carrier grade estimator 30 which determines grades for individual carriers (or for predetermined subsets of carriers) based on the SNR values (or other signal magnitude related parameter values). In at least one embodiment, the carrier grade estimator 30 performs a mathematical transformation of the SNR value associated with a carrier to determine the grade for the carrier. The grade may be related to, for example, the information carrying capacity of the corresponding carrier. Other techniques for determining grades may alternatively be used. The grades of the carriers (and/or carrier subsets) are then delivered to the combiner 32 which combines the grades to determine a total score for the associated antenna. In the illustrated embodiment, the combiner 32 sums the grades of the individual carriers to generate a total score for the corresponding antenna. Many other combination techniques may alternatively be used. The total score of the antenna may then be delivered to the antenna controller 34 for storage and/or analysis. The antenna controller 34 may then instruct the antenna switch 24 to couple another antenna in the group 22 to the FFT 26 so that a total score may be generated for the new antenna.

In at least one implementation, the antenna controller 34 sequences through each of the antennas within the group 22 (or within a subset of the group 22) to determine a total score for each of the tested antennas. The antenna controller 34 may then select an antenna to act as the receive antenna in subsequent communication activities based on an analysis of the antenna scores. In at least one embodiment, the antenna controller 34 selects the antenna that has the highest total score as the receive antenna. However, other selection techniques may also be appropriate based on, for example, the specific process used for calculating the total scores (e.g., in some embodiments, the "best" score may be the lowest total score, etc.). In the system 20 of FIG. 1, total scores are calculated for the individual antennas one after another. In other embodiments, scores for each of the antennas under test may be calculated in parallel instead of sequentially (e.g., by providing a separate carrier SNR estimator 28, carrier grade estimator 30, and combiner 32 for each antenna to be tested). In still other embodiments, received signals are digitized and stored for each antenna under test. The stored information for the antennas under test may then be delivered to the carrier SNR estimator 28, the carrier grade estimator 30, and the combiner 32 one after another (or in parallel to multiple sets of units) to determine total scores for the individual antennas. As will be appreciated, many alternative architectures and approaches may be used to develop the scores for the individual antennas.

It should be appreciated that the blocks of FIG. 1 are functional in nature and do not necessarily correspond to discrete hardware elements. For example, in at least one embodiment, two or more of the blocks are implemented in software within a single (or multiple) digital processing unit(s). Such digital processing units may include, for example, one or more general purpose microprocessors, digital signal processors (DSPs), reduced instruction set computers (RISC), complex instruction set computers (CISCs), field programmable gate arrays (FPGAs), application specific integrated circuits (ASICs), and/or others. The individual blocks may be implemented in hardware, software, and/or firmware. Hybrid implementations may also be used.

As described above, in at least one embodiment of the present invention, grades are developed for individual carriers associated with an antenna that are related to the information carrying capacity of the corresponding carrier. In one approach, it was appreciated that as the SNR associated with a carrier increases, a point is reached beyond which there is little or no additional benefit to the overall bit error rate (BER) of the system. Similarly, as the SNR associated with a carrier decreases, a point is reached beyond which little or no further reduction in BER is typically experienced. In at least one embodiment, therefore, a mathematical transformation is used to generate grades for individual carriers that takes into account this double asymptotic characteristic. For example, in one implementation, a function $f(SNR[dB])$ (that will be referred to herein as the "Kapasity function") is used to generate the carrier grades based on the corresponding SNR. The Kapasity function may be expressed as follows:

$$f(SNR[dB]) = \frac{1}{1 + \exp\left[\frac{d - SNR[dB]}{q}\right]}$$

where SNR[dB] is the signal-to-noise ratio in decibels and d and q are constants. The Kapasity function displays the asymptotic behavior described above as the SNR is increased or decreased. A wide variety of alternative functions may also be used, some of which also display such asymptotic behavior. In a hardware implementation, a piecewise linear approximation of such a function can be used. The parameters d and q are free parameters that allow the function to be tuned for enhanced antenna selection performance. Factors that affect the optimal values of d and q are, for example, the type of error correction coding, the data modulation scheme, the available resources for calculating the Kapasity function, and others. For Quadrature Phase-Shift Keying (QPSK) and Binary Phase-Shift Keying (BPSK) modulation, the value of d will typically be optimal around zero dB. In such a case, the Kapasity function goes to zero for negative SNR and approaches one for high positive values of SNR. In at least one approach, the values of d and q are adaptively and/or empirically tuned for enhanced performance. It should be appreciated that the Kapasity function described above is simply one form of carrier grade that may be used in accordance with the present invention. Many other grading techniques may alternatively be used.

Figure 2:
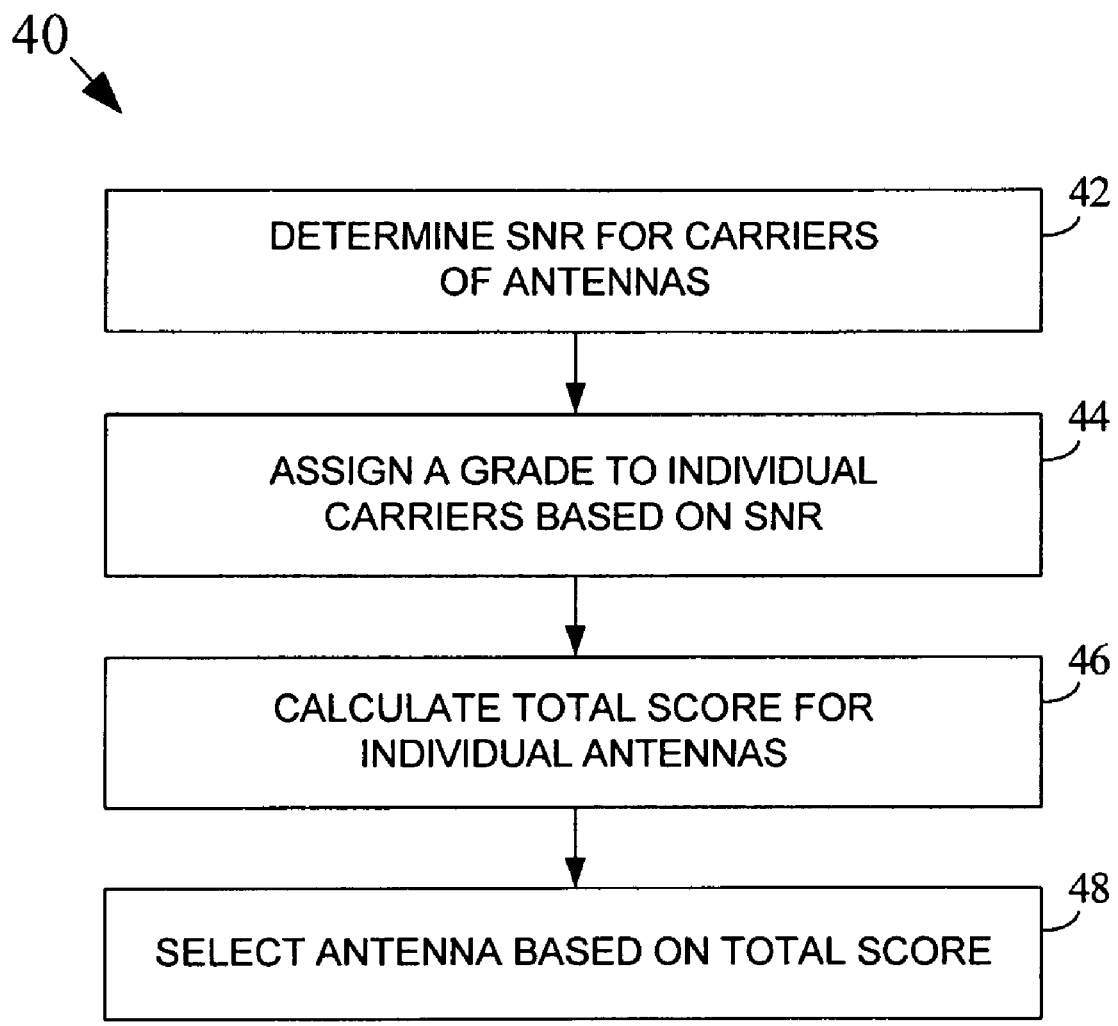
FIG. 2 is a flowchart illustrating an example method for selecting an antenna in a multicarrier communication system in accordance with an embodiment of the present invention.

FIG. 2 is a flowchart illustrating an example method 40 for selecting an antenna in a multicarrier communication system in accordance with an embodiment of the present invention. Signal-to-noise ratios (SNR) or other signal magnitude related parameters are determined for individual carriers associated with multiple antennas (block 42). Based on the SNR values (or values of other signal magnitude related parameters), grades are assigned to the individual carriers (or to subsets of carriers) of each antenna (block 44). In at least one approach, a mathematical transformation is used to determine the grade of a carrier (or subset of carriers) based on the corresponding SNR (or other signal magnitude related parameter). The mathematical transformation may be related to, for example, the information capacity of the corresponding sub-channel (e.g., according to Shannon's law). In at least one embodiment, the mathematical transformation is a non-linear transformation. Other forms of transformation may alternatively be used. In at least one implementation, the transformation that is used is optimized empirically and/or adaptively.

Total scores are calculated for individual antennas using the grades of the associated carriers (and/or subsets of carriers) (block 46). In at least one approach, a total score is calculated for an antenna by summing the grades of the corresponding carriers and/or subsets of carriers. Other techniques for calculating total scores may alternatively be used and will typically depend upon the type of grades that are assigned. An antenna is eventually selected based on the total scores of the antennas (block 48). In at least one approach, an antenna having a greatest total score is selected, although other selection techniques are also possible (e.g., an antenna having a lowest total score, etc.). The selection technique that is used in a particular implementation will typically depend upon the type of total score that is calculated. It should be appreciated that the order of the actions described above are not meant to be limiting. For example, blocks 42, 44, and 46 may be repeated in order for each antenna rather than being performed once for all antennas. Other modifications to the method 40 may also be made.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

The invention claimed is:

1. A method for use in a multicarrier communication system, comprising:
    determining signal magnitude related parameters for carriers of a multicarrier signal received by a first antenna within a first estimator;
    assigning grades to said carriers of said multicarrier signal received by said first antenna based on said signal magnitude related parameters within a second estimator;
    calculating a total score for said first antenna using said grades within a combiner; and
    selecting an antenna to use as a receive antenna, from a group of antennas that includes said first antenna, using said total score of said first antenna within an antenna controller.

2. The method of claim 1, wherein:
    selecting an antenna includes comparing said total score of said first antenna with total scores of other antennas within said group of antennas.

3. The method of claim 2, wherein:
    selecting an antenna includes selecting an antenna with a highest total score.

4. The method of claim 1, wherein:
    said signal magnitude related parameters include signal-to-noise ratios (SNRs).

5. The method of claim 1, wherein:
    determining signal magnitude related parameters includes determining a signal-to-noise ratio for a first carrier of said multicarrier signal received by said first antenna and determining a signal-to-noise ratio for a second carrier of said multicarrier signal received by said first antenna.

6. The method of claim 1, wherein:
    assigning grades includes calculating a grade for a first carrier of said multicarrier signal received by said first antenna based on a corresponding SNR value.

7. The method of claim 6, wherein:
    assigning grades includes calculating a grade for said first carrier of said multicarrier signal received by said first antenna using the following equation:

$$\text{grade}(SNR[dB]) = \frac{1}{1 + \exp\left[\frac{d - SNR[dB]}{q}\right]}$$

where SNR[dB] is a signal-to-noise ratio, in decibels, of said first carrier associated with said first antenna, and d and q are constants.

8. The method of claim 1, wherein:
    assigning grades includes calculating a grade for a first carrier of said multicarrier signal received by said first antenna that is related to an information carrying capacity of said first carrier.

9. The method of claim 1, wherein:
    calculating a total score for said first antenna includes summing grades for carriers of said multicarrier signal received by said first antenna.

10. An apparatus for use in a multicarrier communication system, comprising:
    a first estimator to estimate signal magnitude related parameters for carriers of a multicarrier signal received by a first antenna;
    a second estimator to estimate grades for said carriers of said multicarrier signal received by said first antenna using said estimated signal magnitude related parameters;
    a combiner to determine a total score for said first antenna by combining grades of carriers of said multicarrier signal received by said first antenna; and
    an antenna controller to select an antenna, from a group of antennas that includes said first antenna, for use in communicating with a remote entity based on total scores of antennas in said group of antennas.

11. The apparatus of claim 10, wherein:
    said multicarrier signal received by said first antenna is an orthogonal frequency division multiplexing (OFDM) signal.

12. The apparatus of claim 10, wherein:
    said signal magnitude related parameters include signal-to-noise ratios (SNRs).

13. The apparatus of claim 10, wherein:
    said combiner includes a summer to sum grades of carriers of said multicarrier signal.

14. The apparatus of claim 10, wherein:
    said first estimator also estimates signal magnitude related parameters for carriers of multicarrier signals received by antennas in said group of antennas other than said first antenna.

15. The apparatus of claim 10, wherein:
    said second estimator also determines grades for carriers of multicarrier signals received by antennas in said group of antennas other than said first antenna.

16. The apparatus of claim 10, wherein:
    said combiner also determines total scores for antennas in said group of antennas other than said first antenna by combining corresponding grades.

17. The apparatus of claim 10, wherein:
    said second estimator estimates a grade for a carrier of said multicarrier signal received by said first antenna by performing a mathematical transformation using an SNR of said carrier.

18. An article comprising a computer readable storage medium having instructions stored thereon that, when executed by a computing platform, result in:
    determining signal magnitude related parameters for carriers of a multicarrier signal received by a first antenna;
    assigning grades to said carriers of said multicarrier signal received by said first antenna based on said signal magnitude related parameters, wherein assigning grades includes calculating a grade for said first carrier of said multicarrier signal received by said first antenna using the following equation:

$$\text{grade}(SNR[dB]) = \frac{1}{1 + \exp\left[\frac{d - SNR[dB]}{q}\right]}$$

where SNR[dB] is a signal-to-noise ratio, in decibels, of said first carrier associated with said first antenna, and d and q are constants;
    calculating a total score for said first antenna using said grades; and
    selecting an antenna to use as a receive antenna, from a group of antennas that includes said first antenna, using said total score of said first antenna.

19. The article of claim 18, wherein:
    said signal magnitude related parameters include signal-to-noise ratios (SNRs).

20. The article of claim 18, wherein:
assigning grades includes calculating a grade for a first carrier of said multicarrier signal received by said first antenna that is related to an information carrying capacity of said first carrier.

21. An apparatus for use in a multicarrier communication system comprising:
a plurality of antennas, said plurality of antennas including at least one dipole antenna;
a first estimator to estimate signal magnitude related parameters for carriers of a multicarrier signal received by a first antenna;
a second estimator to estimate grades for said carriers of said multicarrier signal received by said first antenna using said estimated signal magnitude related parameters;
a combiner to determine a total score for said first antenna by combining grades of carriers of said multicarrier signal received by said first antenna; and
an antenna controller to select an antenna, from a group of antennas that includes said first antenna, for use in communicating with a remote entity based on total scores of antennas in said group of antennas.

22. The apparatus of claim 21, wherein:
said multicarrier signal received by said first antenna is an orthogonal frequency division multiplexing (OFDM) signal.

23. The apparatus of claim 21, wherein:
said signal magnitude related parameters include signal-to-noise ratios (SNRs).

* * * * *

UNITED STATES PATENT AND TRADEMARK OFFICE
CERTIFICATE OF CORRECTION

PATENT NO.        : 7,623,836 B1
APPLICATION NO. : 10/465291
DATED             : November 24, 2009
INVENTOR(S)       : Yuval Finkelstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1878 days.

Signed and Sealed this

Twenty-sixth Day of October, 2010

David J. Kappos
*Director of the United States Patent and Trademark Office*